United States Patent [19]

Kurata et al.

[11] Patent Number: 5,123,624
[45] Date of Patent: Jun. 23, 1992

[54] TORSIONAL DAMPER

[75] Inventors: Tomoyuki Kurata; Hideo Kemuyama, both of Kanagawa, Japan

[73] Assignee: Bridgestone Corporation, Tokyo, Japan

[21] Appl. No.: 631,595

[22] Filed: Dec. 21, 1990

[30] Foreign Application Priority Data

Dec. 15, 1989 [JP] Japan .................................. 1-335549

[51] Int. Cl.⁵ ........................................... F16M 13/00
[52] U.S. Cl. .................................................. 248/559
[58] Field of Search ............... 248/559, 562, 618, 634, 248/635, 636, 638; 188/378, 379

[56] References Cited

U.S. PATENT DOCUMENTS

| | | | |
|---|---|---|---|
| 3,368,807 | 2/1968 | Thrasher | 248/562 |
| 3,667,706 | 6/1972 | Tiberghien | 248/559 |
| 4,453,693 | 6/1984 | Krux | 248/559 |
| 4,697,781 | 10/1987 | Hamano | 248/559 |
| 4,766,984 | 8/1988 | Gaffey | 248/559 |

*Primary Examiner*—David M. Purol
*Assistant Examiner*—Robert A. Olson
*Attorney, Agent, or Firm*—Jordan and Hamburg

[57] ABSTRACT

A torsional damper comprises a pulley hub fixed to a rotary shaft such as the crank shaft of an engine or the like, and a damper mass fixed, by means of a damping rubber, in a cavity formed in the front portion of the pulley hub. A projection is provided on the outer circumference of the damper mass, and a groove is formed in the pulley hub oppositely to the projection to receive a part of the projection.

5 Claims, 4 Drawing Sheets

TORSIONAL DAMPER

BACKGROUND OF THE INVENTION

1. Field of the Invention

The present invention relates to a torsional damper comprising a pulley hub fixed to a rotary shaft such as a crank shaft, drive shaft, propeller shaft or the like, and a damper mass fixed, by means of a damping rubber, in a cavity formed in the front portion of the pulley hub.

2. Description of the Prior Art

Various types of torsional dampers have so far been proposed, including a typical one which comprises a pulley hub 100 fixed to a rotary shaft such as crank shaft of an engine or the like, and a damper mass 103 fixed, by means of a damping rubber 102, in a cavity formed inside of a cylindrical portion 101 of the pulley hub 100 as shown in FIG. 1. The rotary shaft is installed in a fixing hole 104 in the pulley hub 100. Further, in this conventional torsional damper, a first steel cylindrical damper mass 105 is disposed outside of, concentrically with, and with a radial spacing from, the cylindrical portion 101 of the pulley hub 100, and a damping rubber 106 is interposed between the cylindrical portion 101 and the first damper mass 105. There is interposed between the damping rubber 106 and the cylindrical portion 101 a metallic sleeve 107 press-fitted on the outer circumference of the cylindrical portion 101. The first damper mass 105 absorbs mainly the torsional vibration of the rotary shaft, while the damper mass 103 absorbs mainly the bending vibration of the rotary shaft (a vibration perpendicular to the rotary shaft). A torsional damper of this type is called a "dual type". Furthermore, there is provided an annular retainer 108, of which a bend 109 is fitted on the inner circumference of the cylindrical portion 101, to prevent the damping rubber 102 coupling the damper mass 103 with the pulley hub 100 from being damaged and also the damper mass 103 from falling off the pulley hub 100 and dropping out of the cavity.

As mentioned above, the retainer 108 provided in the conventional torsional damper as a means of preventing the damper mass 103 from falling off the pulley hub 100 has the bend 109 thereof fitted on the inner circumference of the cylindrical portion 101. Hence, the inner circumference of the cylindrical portion 101 must be worked with a high dimensional precision in a large thereof, and also the retainer 108 be worked similarly. For a precision fitting of the retainer 108 into the cylindrical portion 101, the inner circumference of the cylindrical portion 101 and the bend 109 of the retainer 108 must be ground over the large fitting area thereof, which results in increased manufacturing costs. Also, since the retainer 108 is fixed to the cylindrical portion 101 of the pulley hub 100, the pulley hub 100 has an increased weight, possibly resulting in a reduced attenuation of vibration. Furthermore, when the damper mass 103 falls off the pulley hub 100, the cavity in the cylindrical portion 101 and the portion of the pulley hub 100 installed on the rotary shaft will possibly be broken.

SUMMARY OF THE INVENTION

Accordingly, the present invention has an object to overcome the above-mentioned drawbacks of the conventional torsional dampers by providing a torsional damper which can be manufactured without any grinding of the pulley hub and in which an easy and low cost working permits secure retention of the damper mass without any increased weight of the pulley hub and without any reduced absorption of vibration.

The above object can be attained by providing a torsional damper having, according to the present invention, a projection provided on the outer circumference of the damper mass and a groove provided in the pulley hub oppositely to the projection and which receives a part of the projection.

The damper mass is fixed, by means of a damping rubber, in a cavity formed in the front portion of the pulley hub fixed to a rotary shaft. Even if the damper mass is about to fall off the pulley hub, a part of the projection provided on the outer circumference of the damper mass will stay in the groove in the pulley hub, so that the damper mass will not fall off the cylindrical portion of the pulley hub. In the conventional torsional damper, the retainer is provided on the pulley hub side. On the contrary, the retainer in the torsional damper according to the present invention is provided on the damper mass side. Thus, in the torsional damper according to the present invention, the weight of the pulley hub will not increase, and so the vibration attenuation by the torsional damper will not decrease, and so the vibration attenuation by the torsional damper will not, i.e., be degraded. Therefore, by calculating the weight of the damper mass taking the weight of the projection into account, it is possible according to the present invention to design the torsional damper for a desired attenuation of vibration.

DETAILED DESCRIPTION OF THE PREFERRED EMBODIMENTS

The preferred embodiments of the torsional damper according to the present invention will be described in further detail with reference to the drawings.

Figure 1:
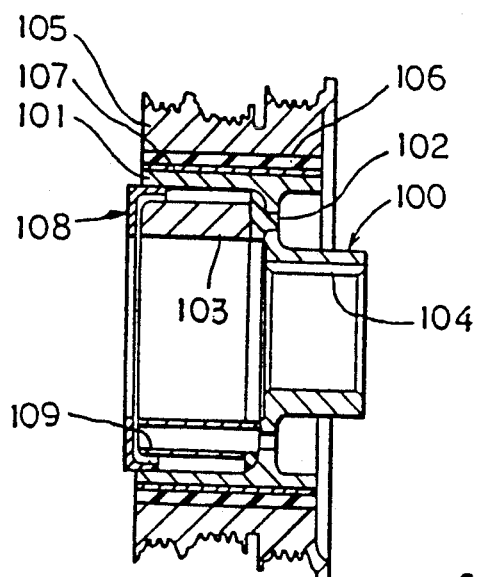
FIG. 1 is a sectional view of a conventional torsional damper.
Figure 2:
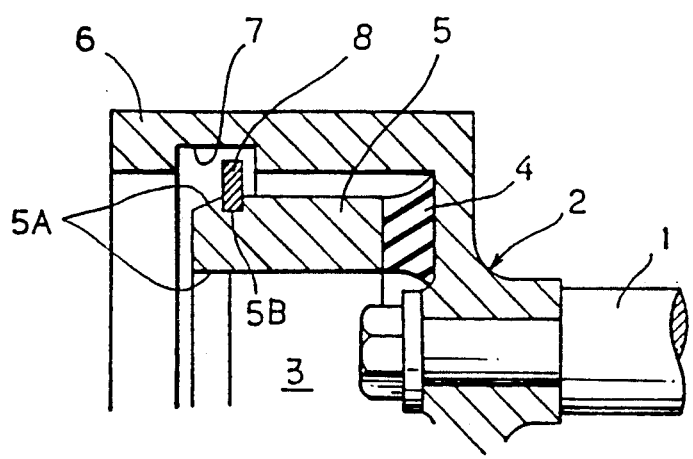
FIG. 2 is a sectional view of one embodiment of the torsional damper according to the present invention.
Figure 3:
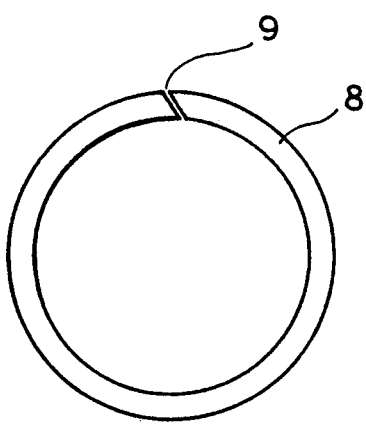
FIG. 3 is a front view of the projection provided in the first embodiment.

The torsional damper according to the first embodiment of the present invention, shown in FIG. 2, comprises a pulley hub 2 fixed to a rotary shaft 1 such as crank shaft of an engine and a damper mass 5 fixed, by means of a damping rubber 4, in a cavity 3 formed in the front portion of the pulley hub 2. The cavity 3 is defined by a cylindrical portion 6 of the pulley hub 2. There is formed in the inner circumference of the cylindrical portion 6 of the pulley hub 2 an annular groove 7 in which a projection 8 formed on the outer circumference of the damper mass 5 is partially received. The projection 8 consists of a ring having a cut 9 formed therein as shown in FIG. 3. Owing to the cut 9, the projection or ring 8 can have a larger diameter when necessary. In this embodiment, the damper mass 5 has a taper portion 5A formed at the end thereof. As the ring 8 is inserted from the taper portion 5A toward a recess 5B formed in the damper mass 5, the cut 9 in the ring 8 will spread. When the ring 8 is put into the recess 5B, the cut 9 will contract due to the resilience of the ring 8, namely, the ring 8 is fitted in the recess 5B. However, the ring 8 can be designed so as to fit in the recess 5B with such taper portion 5A not provided.

Figure 4:
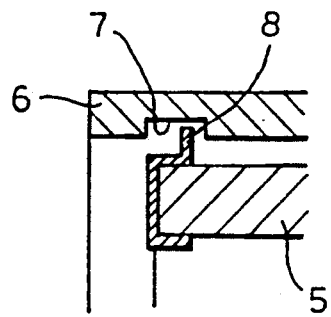
FIG. 4 is a sectional view of a second embodiment of the torsional damper according to the present invention.
Figure 5:
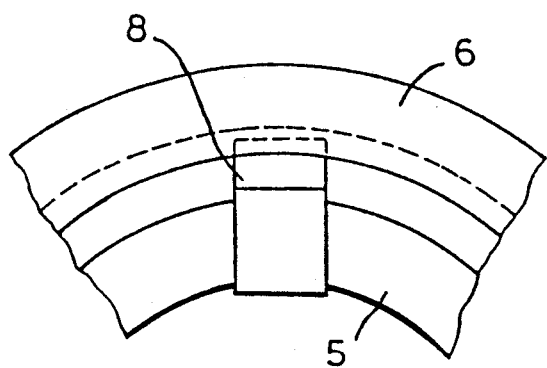
FIG. 5 is a schematic front view of the projection in FIG. 3.
Figure 6:
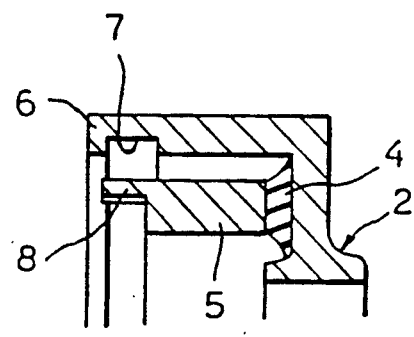
FIG. 6 is a sectional view of a third embodiment of the torsional damper according to the present invention.
Figure 7:
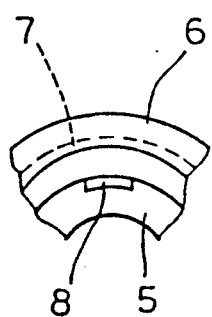
FIG. 7 is a schematic front view of the third embodiment in FIG. 6.

In the second embodiment shown in FIGS. 4 and 5, the projections 8 are provided at several places on the damper mass 5. The projection 8 is carried by a member having a C-like section of which the parallel two sides are fitted on the end of the damper mass 5. The projection 8 is formed integrally on one of such two sides of the member.

Figure 8:
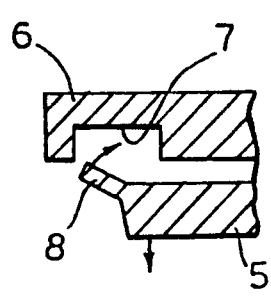
FIG. 8 is a sectional view showing the projection which is being bent from the state shown in FIG. 6.
Figure 9:
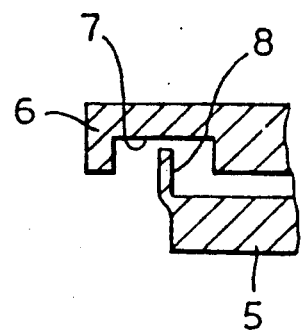
FIG. 9 is a sectional view of the completed projection.

In the third embodiment shown in FIGS. 6 thru 9, a part serving as the projection (pawl) 8 is pre-formed integrally on the end of the damper mass 5. The pawl 8 is so bent upward as shown in FIG. 8 that it is partially received in the proove 7. In the state shown in FIG. 8, the pawl 8 is put into the groove 7 with the end of the damper mass 5 slightly pushed down (the damper mass 5 is bent down at the damping rubber 4).

Figure 10:
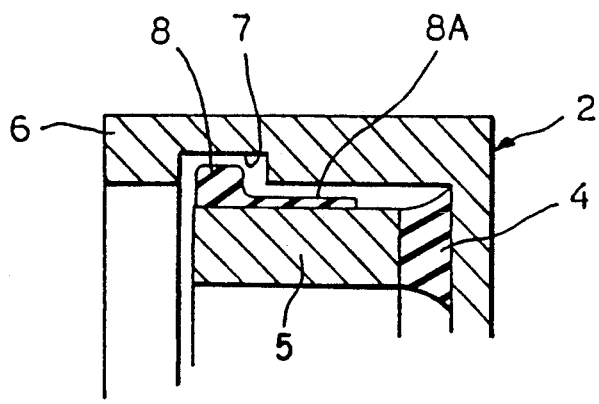
FIG. 10 is a sectional view of a fourth embodiment of the torsional damper according to the present invention.
Figure 11:
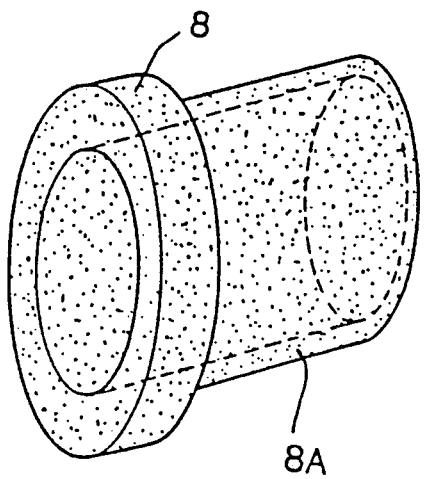
FIG. 11 is a perspective view of a cylinder on which the projection used in the fourth embodiment is formed.

In the fourth embodiment shown in FIGS. 10 and 11, the projection 8 is made of a resilient material such as rubber. A cylinder 8A on which the projection 8 is formed integrally is formed as shown in FIG. 11, and it is fitted on the outer circumference of the damper mass 5 as shown in FIG. 10.

Figure 12:
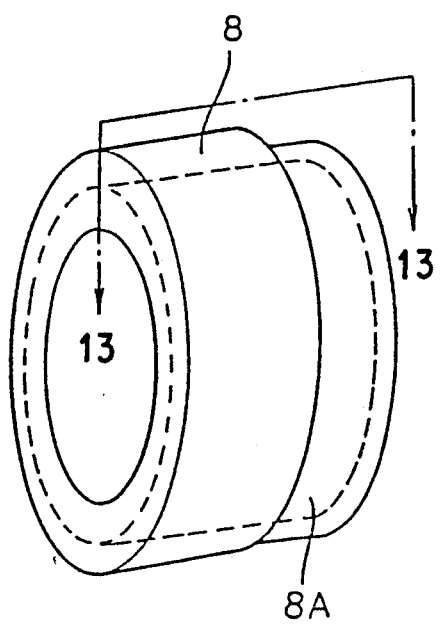
FIG. 12 is a perspective view of a variation of the cylinder on which the projection is formed.
Figure 13:
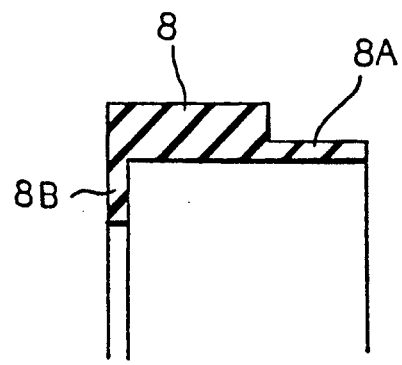
FIG. 13 is a sectional view taken along the line A—A in FIG. 12.

FIGS. 12 and 13 show the projection 8 formed on a part of a cylinder 8A made of a resilient material such as rubber, and which also has provided integrally therewith a flange portion 8B which covers a part of the end face of the damper mass 5. The cylinder 8A thus made of a rubber or the like is also fitted on the damper mass 5 as in the fourth embodiment.

Figure 14:
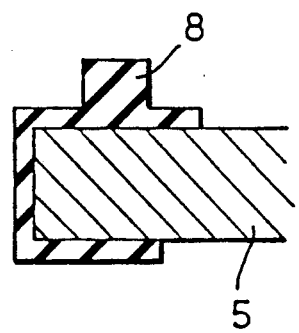
FIG. 14 is a sectional view of a fifth embodiment of the torsional damper according to the present invention.
Figure 15:
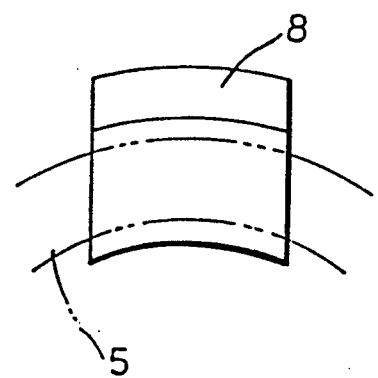
FIG. 15 is a schematic front view of the fifth embodiment in FIG. 14.

In the fifth embodiment shown in FIGS. 14 and 15, the projection 8 is made of a resilient material such as rubber, and is provided at several places on the damper mass 5 as in the second embodiment shown in FIGS. 4 and 5.

The projection 8 made of a resilient material such as rubber unlikely will damage the cylindrical portion 6 even if the damper mass 5 falls off.

In the foregoing, the embodiments of the torsional damper according to the present invention have been described only with the damper mass 5 provided parallelly to the rotary shaft 1, but, of course, the first damper mass 105 such as in the conventional torsional damper may be used with the present invention.

As having been described in the foregoing, at least one projection is provided on the outer circumference of the damper mass in the torsional damper according to the present invention and there is formed in the pulley hub a groove opposite to the projection and which receives a part of the projection. Even if the damping rubber coupling the damper mass to the pulley hub is broken, the projection provided on the outer circumference of the damper mass will stay in the groove in the pulley hub, so the damper mass will not possibly fall off. Also, since the means of preventing the damper mass from falling off is mounted on the damper mass itself, the weight of that means is not added to the pulley hub and thus the vibration absorption is not degraded, contrary to the conventional torsional damper. Furthermore, it is not necessary to grind the inner circumference of the pulley hub, and the projection (or projections) can be provided extremely easily on the outer circumference of the damper mass. Therefore, the forming of the projection on the outer circumference of the damper mass will not lead to any increase of the manufacturing costs. Moreover, in case the projection (or projections) is made of a resilient material, even if the damping rubber is broken and the damper mass rolls inside the groove in the pulley hub, the inner circumference of the pulley hub and the portion thereof installed on the rotary shaft will not possibly be damaged.

What is claimed is:

1. A torsional damper having a pulley hub fixed to a rotary shaft, and a damper mass fixed, by means of a damping rubber, in a cavity formed in the front portion of the pulley hub, comprising:
   a projection provided on the outer circumference of said damper mass; and a groove provided in said pulley hub oppositely to said projection and which receives a part of said projection.

2. A torsional damper according to claim 1, wherein a taper portion is formed at the end of said damper mass, and an annular projection having a cut formed therein is inserted from the end of said taper portion and thus fitted into a recess formed in the end portion of said taper portion.

3. A torsional damper according to claim 1, wherein said projection is carried by a member having a C-like section of which the parallel two sides are fitted on the end of said damper mass, said projection being formed integrally on one of the two sides of said member.

4. A torsional damper according to claim 1, wherein a pawl is pre-formed integrally on the end of said damper mass and is bent so as to serve as said projection.

5. A torsional damper according to claim 1, wherein said projection is formed integrally on a cylinder made of a resilient material such as rubber and said cylinder is fitted on the outer circumference of said damper mass.

* * * * *

UNITED STATES PATENT AND TRADEMARK OFFICE
CERTIFICATE OF CORRECTION

PATENT NO. : 5,123,624
DATED : June 23, 1992
INVENTOR(S) : Tomoyuki KURATA et al It is certified that error appears in the above-identified patent and that said Letters Patent is hereby corrected as shown below:

On the title page:

Item [30], change "Dec. 15, 1989" to --Dec. 25, 1989--.

Signed and Sealed this

Third Day of August, 1993

Attest:

MICHAEL K. KIRK

Attesting Officer

Acting Commissioner of Patents and Trademarks